(12) United States Patent
Medagam et al.

(10) Patent No.: US 10,931,205 B2
(45) Date of Patent: Feb. 23, 2021

(54) CONTROLLING AN ACTIVE SINGLE PHASE TO THREE PHASE POWER CONVERTER

(71) Applicants: Peda V Medagam, Rapid City, SD (US); Jack Yang, Rapid City, SD (US)

(72) Inventors: Peda V Medagam, Rapid City, SD (US); Jack Yang, Rapid City, SD (US)

(73) Assignee: Phase Technologies, LLC, Rapid City, SD (US)

( * ) Notice: Subject to any disclaimer, the term of this patent is extended or adjusted under 35 U.S.C. 154(b) by 0 days.

(21) Appl. No.: 16/389,777

(22) Filed: Apr. 19, 2019

(65) Prior Publication Data

US 2019/0252991 A1    Aug. 15, 2019

Related U.S. Application Data

(63) Continuation of application No. 15/798,102, filed on Oct. 30, 2017, now Pat. No. 10,333,420.

(51) Int. Cl.
*H02M 5/293* (2006.01)
*H02M 1/084* (2006.01)
*H02M 5/458* (2006.01)

(52) U.S. Cl.
CPC ........... *H02M 5/293* (2013.01); *H02M 1/084* (2013.01); *H02M 5/4585* (2013.01); *H02M 2005/2932* (2013.01); *Y02B 70/10* (2013.01)

(58) Field of Classification Search
CPC .... H02M 5/4585; H02M 5/458; H02M 1/084; H02M 5/293; H02M 2005/2932; Y02B 70/145
See application file for complete search history.

(56) References Cited

U.S. PATENT DOCUMENTS

| | | | | |
|---|---|---|---|---|
| 5,272,616 A | * | 12/1993 | Divan | H02M 5/458 318/768 |
| 6,297,971 B1 | * | 10/2001 | Meiners | H02M 5/4585 363/36 |
| 10,333,420 B2 | * | 6/2019 | Medagam | H02M 5/4585 |

* cited by examiner

*Primary Examiner* — Kyle J Moody
*Assistant Examiner* — Jye-June Lee

(57) ABSTRACT

A phase converter that converts single phase AC electric power to balanced three phase AC power. Two input terminals are connectable to a single phase AC power source, and connect directly to two output terminals of the converter. The phase converter has a storage capacitor, three active half bridge modules connected to the storage capacitor and a controller. Two modules connect to the input terminals and charge the storage capacitor. The other module connects to a third output terminal. The controller switches the module connected to the third output terminal and one of the other modules to generate and shape a second phase and a resultant third phase.

20 Claims, 3 Drawing Sheets

CONTROLLING AN ACTIVE SINGLE PHASE TO THREE PHASE POWER CONVERTER

RELATED APPLICATIONS

This application is a continuation of U.S. patent application Ser. No. 15/798,102, filed Oct. 30, 2017 and entitled "Active Single Phase to Three Phase Power Converter," which is incorporated herein by referenced in its entirety.

TECHNICAL FIELD

The present invention relates to phase converters and more particularly to a phase converter for converting single phase AC power to three phase AC power.

BACKGROUND ART

Three phase AC motors are generally simpler, more reliable and more efficient than single phase AC motors. In addition to three phase AC motors, much high-power industrial equipment requires three phase AC power. The load of such equipment can be inductive, capacitive or resistive.

Three phase AC power is generally supplied to industrial areas. However, only single phase AC power is available to most residential and rural areas. The single phase AC power available in most residential and rural areas is provided by a step down transformer connected to a high voltage line and, in the United States, is normally supplied as about 240 volts or 480 volts at 60 Hz between the first and second input lines.

For areas where three phase AC power is not available, various solutions have been used to convert single phase power to three phase power. For motor load applications, static and rotary converters are a low cost solution. These static and rotary converters, however, have a high percentage of voltage unbalance and low efficiency. Inverters, including AC drives, convert the entire single phase AC input voltage into DC voltage then invert the DC voltage into AC three phase output voltage. Such inverters are generally more complex and expensive than static and rotary converters. The output voltages of such inverters consist of pulse-width-modulated (PWM) signals with high harmonic content, so that the applications of these inverters are limited to inductive motor loads unless additional expensive filtering circuits are used.

U.S. Pat. No. 6,297,971 to Meiners discloses a digital phase converter that converts a single phase input voltage into a three phase output voltage without converting the whole input AC voltage into DC voltage. The converter disclosed converts 240V AC single phase voltage into balanced three phase AC, and can be used for inductive, capacitive and resistive loads with about 1% output voltage imbalance. U.S. Pat. No. 6,731,525 to Meiners discloses another digital phase converter that converts a single phase input voltage into a three phase output voltage without converting the whole input AC voltage into DC voltage.

DISCLOSURE OF THE INVENTION

A phase converter for converting single phase AC power to balanced three phase power AC includes first and second input terminals, first, second and third output terminals, a storage capacitor, active half bridge first, second and third modules, and a controller. The first input terminal connects directly to the first output terminal and the second input terminal connects directly to the second output terminal. The first, second and third modules each have a positive terminal that connects to the positive end of the storage capacitor, a negative terminal that connects to the negative end of the storage capacitor, and an AC terminal. The AC terminal of the first module connects to the first input terminal, the AC terminal of the second module connects to the second input terminal and the AC terminal of the third module connects to the third output terminal. The first, second and third modules each include first and second switches and first and second diodes. The controller connects to the first, second and third modules, selectively driving the first and second switches of the first module to charge the storage capacitor and selectively driving the second and third modules to generate and shape a second phase and a resultant third phase relative to the single phase power, to result in balanced three phase AC power to the first, second and third output terminals.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
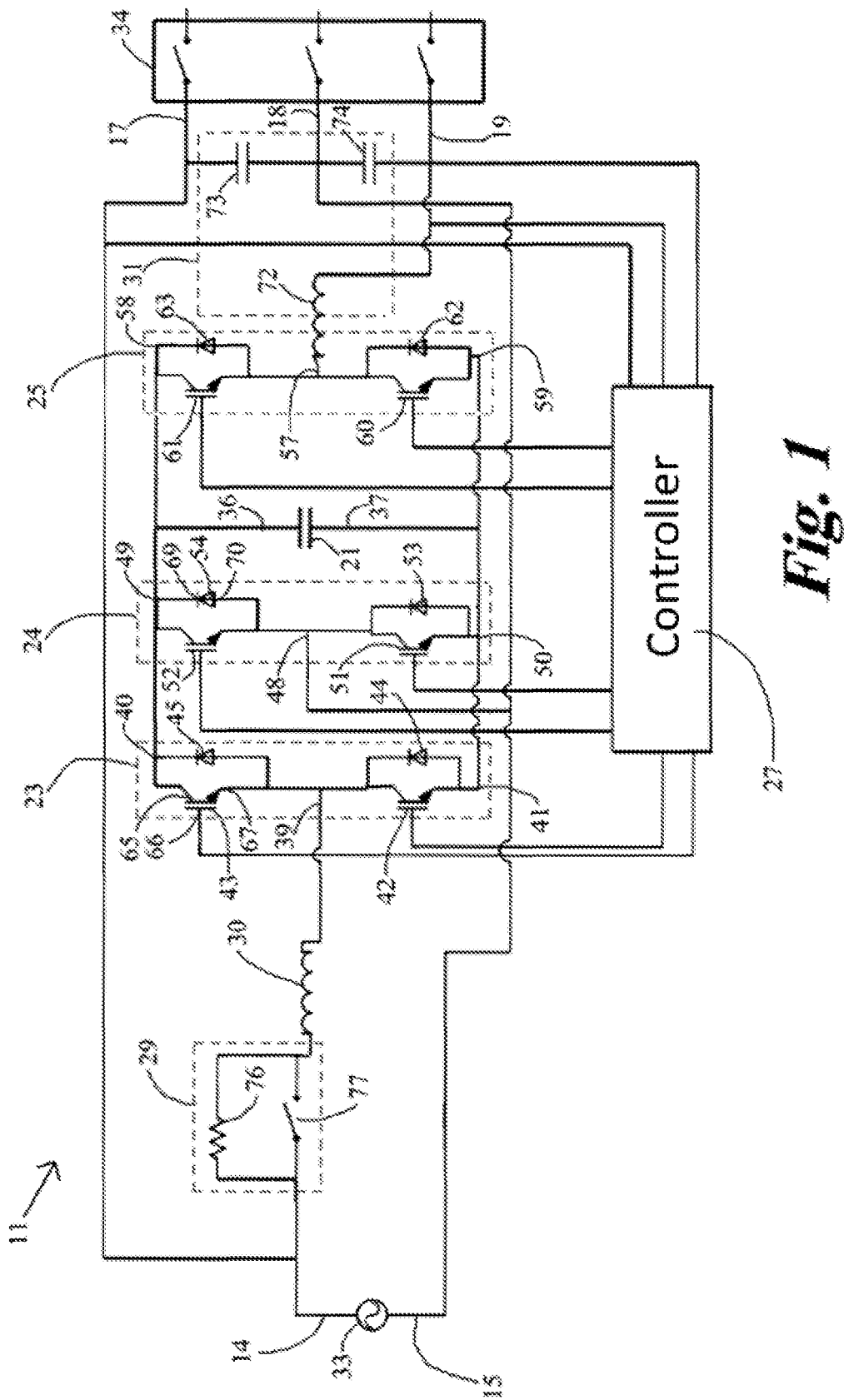
FIG. 1 is a schematic circuit diagram of a phase converter embodying the features of the present invention.

Referring to FIG. 1, a phase converter 11 embodying features of the present invention includes first and second input terminals 14 and 15, first, second and third output terminals 17, 18 and 19, a storage capacitor 21, active half bridge first, second and third modules 23, 24 and 25, and a controller 27. The converter 11 also includes a precharging circuit 29, an input inductor 30 and an output filter 31.

The first and second input terminals 14 and 15 connect to an electrical single phase alternating current (AC) voltage source 33 such as a socket or two terminals connected to a utility company step-down transformer. In the illustrated embodiment the voltage between first and second input terminals 14 and 15 may be 480 VAC. Other voltages are suitable. The first, second and third output terminals 17, 18 and 19 are shown connected to a contactor 34 that can be connected to a three phase load.

The first input terminal connects 14 directly to the first output terminal 17 and the second input terminal 15 connects directly to the second output terminal 18. The precharging circuit 29 connects to the first input terminal 14. The input inductor 30 connects to the precharging circuit 29, opposite the first input terminal 14. The storage capacitor 21 has a positive end 36 and a negative end 37.

The first module 23 includes an AC terminal 39, a positive terminal 40, a negative terminal 41, first and second switches 42 and 43, and first and second diodes 44 and 45. The AC terminal 39 connects to the input inductor 30, opposite the precharging circuit 29. The positive terminal 40 connects to the positive end 36 of the storage capacitor 21. The negative terminal 41 connects to the negative end 37 of the storage capacitor 21.

The second module 24 includes an AC terminal 48, a positive terminal 49, a negative terminal 50, first and second switches 51 and 52, and first and second diodes 53 and 54.

The AC terminal 48 connects to the second input terminal 15. The positive terminal 49 connects to the positive end 36 of the storage capacitor 21. The negative terminal 50 connects to the negative end 37 of the storage capacitor 21.

The third module 25 includes an AC terminal 57, a positive terminal 58, a negative terminal 59, first and second switches 60 and 61, and first and second diodes 62 and 63. The AC terminal 57 connects to the third output terminal 19. The positive terminal 49 connects to the positive end 36 of the storage capacitor 21. The negative terminal 50 connects to the negative end 37 of the storage capacitor 21.

The first switches 42, 51 and 60 and second switches 43, 52 and 61 of the first, second and third modules 23, 24 and 25 are preferably are preferably solid state switches and more preferably Insulated Gate Bipolar Transistors (IGBT). The first switches 42, 51 and 60 and second switches 43, 52 and 61 of the first, second and third modules 23, 24 and 25 each have a collector 65, a base 66 and an emitter 67. The collectors 65 of the first switches 42, 51 and 60 of the first, second and third modules 23, 24 and 25 and the emitters 67 of the second switches 43, 52 and 61 of the first, second and third modules 23, 24 and 25 connect to the respective AC terminals 39, 48 and 57 of the first, second and third modules 23, 24 and 25.

The collectors 65 of the second switches 43, 52 and 61 of the first, second and third modules 23, 24 and 25 connect to the respective positive terminals 40, 49 and 58 of the first, second and third modules 23, 24 and 25. The emitters 67 of the first switches 42, 51 and 60 of the first, second and third modules 23, 24 and 25 connect to the respective negative terminals 41, 50 and 59 of the first, second and third modules 23, 24 and 25. The bases 66 of the first switches 42, 51 and 60 and second switches 43, 52 and 61 of the first, second and third modules 23, 24 and 25 connect to the controller 27.

The first diodes 44, 53 and 62 and second diodes 45, 54 and 63 of the first, second and third modules 23, 24 and 25 each have a cathode 69 and an anode 70. The cathodes 69 of the first diodes 44, 53 and 62 of the first, second and third modules 23, 24 and 25 and the anodes 70 of the second diodes 45, 54 and 63 of the first, second and third modules 23, 24 and 25 connect to the respective AC terminals 39, 48 and 57 of the first, second and third modules 23, 24 and 25. The cathodes 69 of the second diodes 45, 54 and 63 of the first, second and third modules 23, 24 and 25 connect to the respective positive terminals 40, 49 and 58 of the first, second and third modules 23, 24 and 25. The anodes 70 of the first diodes 44, 53 and 62 of the first, second and third modules 23, 24 and 25 connect to the respective negative terminals 41, 50 and 59 of the first, second and third modules 23, 24 and 25.

The output filter 31 includes a filter inductor 72 connected between the AC terminal 57 of the third module 25 and the third output terminal 19, a first filter capacitor 73 connected between the first and second output terminals 17 and 18, and a second filter capacitor 74 connected between the second and third output terminals 18 and 19. The precharging circuit 29 has a resistor 76 and a switch 77 connected in parallel between the first input terminal 14 and the input inductor 30. The switch 77 is preferably a contactor. When power is applied to the converter 11, the switch 77 is open and the resistor 76 limits current to avoid excessively high input current. After the storage capacitor 21 is charged, the switch 77 is closed to bypass the resistor 76.

Figure 2:
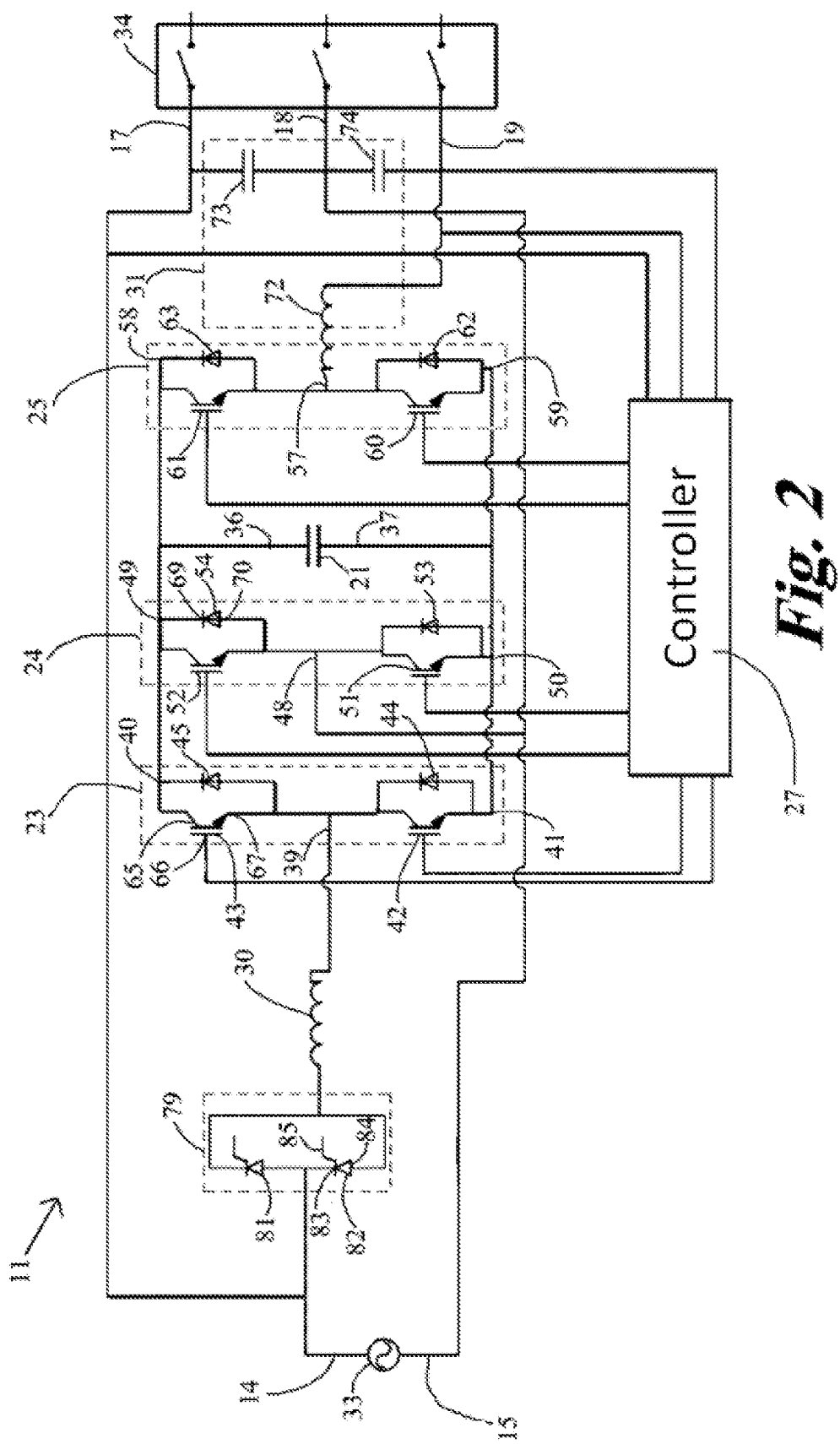
FIG. 2 is a detailed schematic circuit diagram of the converter of FIG. 1 with an alternative precharging circuit.

FIG. 2 shows the converter 11 with an alternative precharging circuit 79 have first and second silicon controlled rectifiers 81 and 82. The first and second silicon controlled rectifiers 81 and 82 each have a cathode 83, an anode 84 and a gate 85. The anode 84 of the first silicon controlled rectifier 81 and the cathode 83 of the second silicon controlled rectifier 82 connect to first input terminal 14. The cathode 83 of the first silicon controlled rectifier 81 and the anode 84 of the second silicon controlled rectifier 82 connect to the input inductor 30. The gates 85 of the first and second silicon controlled rectifiers 81 and 82 connect to and are switched by the controller 27. When power is applied to the converter 11, the first and second silicon controlled rectifiers 81 and 82 are switched to limit current to avoid excessively high input current. After the storage capacitor 21 is charged, the first and second silicon controlled rectifiers 81 and 82 are closed.

The first and second modules 23 and 24 charge the storage capacitor 21. The controller 27 drives the first and second switches 42 and 43 of the first module 23 to maintain a selected voltage on the storage capacitor 21. Proportional integral (PI) control is used to regulate the DC voltage $V_{dc}$ to the reference value $V_{dc}$*. The DC reference voltage must be higher than or equal to the magnitude of the AC source 33 peak voltage for satisfactory operation of the converter 11. The current command amplitude $I_m$ for the converter 11 can be presented by:

$$I_m = K_p(V_{dc}^* - V_{dc}) + K_I \int (V_{dc}^* - V_{dc}) dt$$

where $K_p$ is the proportional gain constant and $K_I$ is the integral gain constant of the PI control.

In order to achieve unity power factor, the converter current command $i_f^*$ is constrained as follows $$i_f^* = I_m \sin \omega t$$

where $\omega$ is the input angular frequency and is calculated by using a Phase Locked Loop (PLL).

Figure 3:
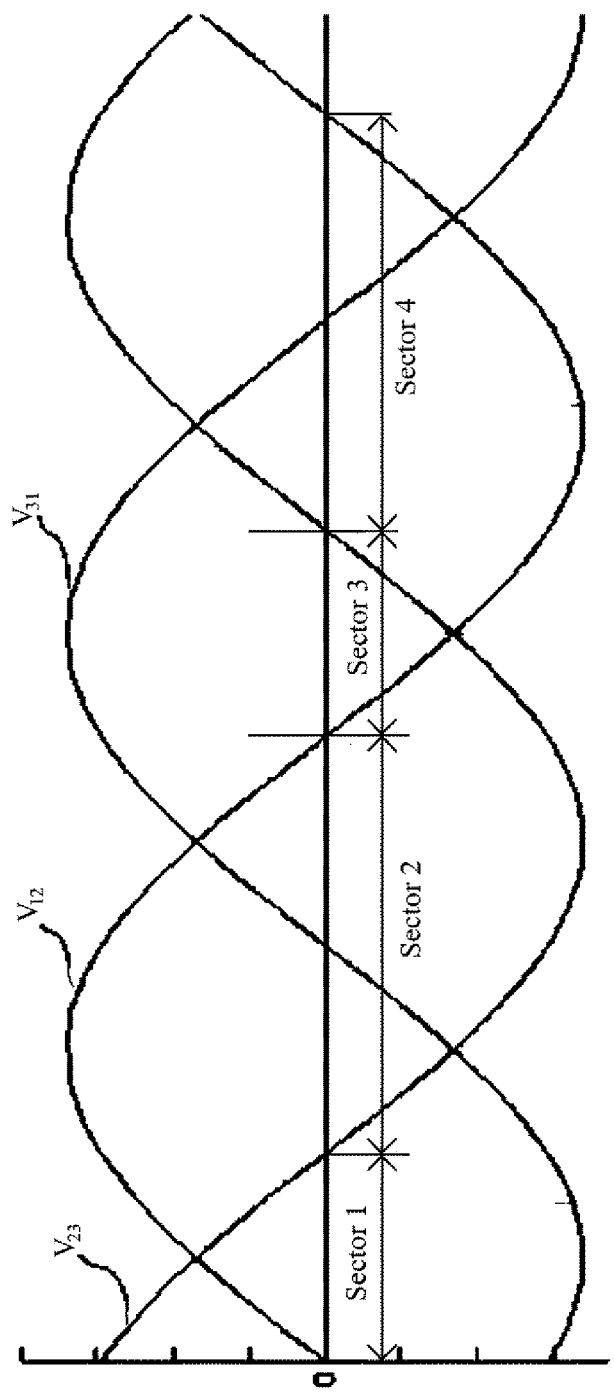
FIG. 3 is a graphical representation of the output voltages of the phase converter of the present invention.

The second and third modules 24 and 25 generate the second phase voltage $V_{23}$ and the resultant third phase voltage $V_{31}$. The controller 27 drives the first and second switches 51, 52, 60 and 61 of the second and third modules 24 and 25 to generate the voltage $V_{23}$, which is equal in magnitude to the input voltage $V_{12}$ from the AC source 33 and 120° out of phase with respect to voltage $V_{12}$. FIG. 3 shows the output voltages of the converter 11. In the following description the first switch 51 of the second module 24 is Z3, the second switch 52 of the second module 24 is Z4, the first switch 60 of the third module 25 is Z5 and the second switch 61 of the third module 25 is Z6. The switching scheme to generate the waveform shown is divided into sectors based on $V_{12}$ and $V_{23}$ voltages. Let Vm be the amplitude (peak) value of $V_{12}$, and $\omega t$ is the phase angle of Viz.

The possible sector combinations are:

Sector 1: $V_{12}$ is positive and $V_{23}$ is positive
Switch Z5=ON, Z6=OFF, Switches Z4 and Z3 are controlled to shape $V_{23}$ voltage into Vm*sin($\omega t$+120°)

Sector 2: $V_{12}$ is positive and $V_{23}$ is negative
Switch Z3=ON, Z4=OFF, Switch Z5 and Z6 are controlled to shape $V_{23}$ voltage into Vm*sin($\omega t$+120°)

Sector 3: $V_{12}$ is negative and $V_{23}$ is negative
Switch Z5=OFF, Z6=ON, Switch Z4 and Z3 are controlled to shape $V_{23}$ voltage into Vm*sin($\omega t$+120°)

Sector 4: $V_{12}$ is negative and $V_{23}$ is positive
Switch Z3=OFF, Z4=ON, Switch Z5 and Z6 are controlled to shape $V_{23}$ voltage into Vm*sin($\omega t$+120°)

As shown, Sector 1 extends from 0° to 60°, Sector 2 from 60° to 180°, Sector 3 from 180° to 240°, and Sector 4 from 240° to 360°, relative to Viz.

The controller 27 drives the first switches 42, 51 and 60 and second switches 43, 52 and 61 of the first, second and third modules 23, 24 and 25 with pulse width modulation (PWM). The output filter 31 converts the PWM signal at the AC terminal 57 of the third module 25 to a pure sine wave. The converter 11 can convert excess three phase AC power from a load to single phase AC power for return to the power grid. The controller 27 drives the first and second switches 42 and 43 of the first module 23 with PWM and the input inductor 30 converts the PWM signal to a pure sine wave that is 180° out of phase with respect to input voltage $V_{12}$.

Although the present invention has been described with a certain degree of particularity, it is understood that the present disclosure has been made by way of example and that changes in details of structure may be made without departing from the spirit thereof.

What is claimed is:

1. A power converter for converting a single phase input signal to a three phase power output signal, comprising:
    a single phase input having a $Vlin_1$ and a $Vlin_2$ and having a voltage differential $V1_{12}$;
    second and third switching modules, each second and third switching module having a pair of switching transistors;
    a three phase power output having a $V3out_1$, a $V3out_2$, and a $V3out_3$, with a voltage differential $V3_{12}$ between $V3out_1$ and $V3out_2$; a voltage differential $V3_{23}$ between $V3out_2$ and $V3out_3$; and a voltage differential $V3_{31}$ between $V3out_3$ and $V3out_1$; and
    a processor for controlling the second and third switching modules, the processor implementing steps of:
        providing a target three phase relationship for $V3_{12}$, $V3_{23}$, and $V3_{31}$;
        defining polarity relationships among $V3_{12}$, $V3_{23}$, and $V3_{31}$ in the target three phase relationship;
        measuring $V3_{12}$ or $V1_{12}$ at a time t, $V3_{12}$ being the same as $V1_{12}$;
        determining, using the polarity relationships defined among $V3_{12}$, $V3_{23}$ and $V3_{31}$, the voltage differentials for $V3_{23}$ or $V3_{31}$ at time t;
        setting, responsive to the determining step, a state of one or more switching transistors in the second and third switching modules; and
        generating, using the second and third switching modules, the voltage differentials $V3_{23}$ and resulting $V3_{31}$.

2. The power converter according to claim 1, wherein $V1in_1$ and $V1in_2$ each connect directly to two outputs of the three phase power output, such that $V1in_1=V3out_1$ and $Vlin_2=V3out_2$ and $V3out_3$ is generated by the switching modules.

3. The power converter according to claim 1, wherein $V3_{12}$, $V3_{23}$, and $V3_{31}$ are 120 degrees out of phase.

4. The power converter according to claim 1, wherein the polarity relationships are defined only between $V3_{12}$ and $V3_{23}$.

5. The power converter according to claim 1, wherein the polarity relationships are defined between $V3_{12}$ and $V3_{23}$ as follows:
    sector 1 polarity is defined when, in the target three phase relationship, that $V3_{12}$ is positive and $V3_{23}$ is positive;
    sector 2 polarity is defined when, in the target three phase relationship, that $V3_{12}$ is positive and $V3_{23}$ is negative;
    sector 3 polarity is defined when, in the target three phase relationship, that $V3_{12}$ is negative and $V3_{23}$ is negative; and
    sector 4 polarity is defined when, in the target three phase relationship, that $V3_{12}$ is negative and $V3_{23}$ is positive.

6. The power converter according to claim 5, wherein the processor further performs steps of:
    if at time t sector 1 polarity is defined, generating the voltage differentials $V3_{23}$ and $V3_{31}$ by controlling the pair of switching transistors in the second switching module;
    if at time t sector 2 polarity is defined, generating the voltage differentials $V3_{23}$ and $V3_{31}$ by controlling the pair of switching transistors in the third switching module;
    if at time t sector 3 polarity is defined, generating the voltage differentials $V3_{23}$ and $V3_{31}$ by controlling the pair of switching transistors in the second switching module; and
    if at time t sector 4 polarity is defined, generating the voltage differentials $V3_{23}$ and $V3_{31}$ by controlling the pair of switching transistors in the third switching module.

7. The power converter according to claim 6, wherein the processor controls the switching transistors of the second and third switching modules using pulse width modulation.

8. The power converter according to claim 6, wherein:
    when sector 1 polarity is defined the processor sets a first switching transistor in the third switching module to be in an on state and a second switching transistor in the third switching module to be in an off state; and
    when sector 3 polarity is defined the processor sets the second switching transistor in the third switching module to be in an on state and the first switching transistor in the third switching module to be in an off state.

9. The power converter according to claim 6, wherein:
    when sector 2 polarity is defined the processor sets a first switching transistor in the second switching module to be in an on state and a second switching transistor in the second switching module to be in an off state; and
    when sector 4 polarity is defined the processor sets the second switching transistor in the second switching module to be in an on state and the first switching transistor in the second switching module to be in an off state.

10. The power converter according to claim 6, wherein sector 1 extends between 0° to 60°, sector 2 between 60° to 180°, sector 3 between 180° to 240°, and sector 4 between 240° to 360°, all relative to $V_{12}$.

11. The power converter according to claim 1, further comprising:
    a first switching module;
    a charging capacitor coupled in parallel with the first, the second and the third switching modules; and
    wherein the processor implements a step of controlling the first switching module to charge the charging capacitor.

12. The power converter according to claim 11, wherein the processor controls the first switching module such that a DC voltage across the charging capacitor is maintained to be approximately a peak voltage of $V1_{12}$.

13. The power converter according to claim 1, wherein the output voltage $V3_{23}$ and $V3_{31}$ are of the same amplitude as $V1_{12}$, and a phase of $V3_{31}$ is 120 degrees lagging of $V1_{12}$ and a phase of $V3_{23}$ is 120 degrees leading of $V1_{12}$.

14. The power converter according to claim 1, further comprising:
    a charging capacitor;
    a first switching module; and
    wherein the processor implements a step of controlling the first switching module to charge the charging capacitor.

15. The power converter according to claim 14, wherein the controller drives a pair of switching transistors in the first switching module to maintain a target voltage on the charging capacitor.

16. A power converter for converting a single phase input signal to a three phase power output signal, comprising:
- three output ports for the three phase power output signal;
- a single phase input coupled to two of the output ports;
- a charging module coupled to the single phase input and to a charging capacitor;
- a second switching module coupled to the charging capacitor;
- a third switching module coupled to the charging capacitor; and
- a processor for controlling the charging and switching modules, the processor implementing steps of:
  - controlling the charging module to charge the charging capacitor to a maintain a target voltage;
  - when a phase of the single phase input is between 0 and 60 degrees, controlling the second switching module to shape an output signal for the third output port;
  - when the phase of the single phase input is between 60 and 180 degrees, controlling the third switching module to shape the output signal for the third output port;
  - when the phase of the single phase input is between 180 and 240 degrees, controlling the second switching module to shape the output signal for the third output port; and
  - when the phase of the single phase input is between 240 and 360 degrees, controlling the third switching module to shape the output signal for the third output port.

17. The power converter according to claim 16, wherein the processor controls one of the second and third switching modules that shape the output signal for the third output port and controls the other one of the second and third switching modules to set a polarity of the shaped output signal.

18. The power converter according to claim 16, wherein the output signal for the third output port is shaped according to equation $V3_{23}=Vm*\sin(\omega t +120°)$, $V3_{31}=Vm*\sin(\omega t-120°)$, where Vm is a peak value of $V1_{12}$, and $\omega t$ is the phase angle of $V1_{12}$.

19. The power converter according to claim 16, wherein the second switching module and the third switching module each have a pair of switching transistors.

20. The power converter according to claim 16, wherein the processor controls the charging module such that a DC voltage across the charging capacitor is maintained to be approximately a peak voltage across the single phase input.

* * * * *